United States Patent [19]
Eggert

[11] 3,832,820
[45] Sept. 3, 1974

[54] PANEL MOUNTING

[75] Inventor: Frank Eggert, Hamburg, Germany

[73] Assignee: The Schlegel Manufacturing Company, Rochester, N.Y.

[22] Filed: Dec. 7, 1971

[21] Appl. No.: 205,497

[30] Foreign Application Priority Data
Dec. 30, 1970 Germany............................ 2064443

[52] U.S. Cl.................... 52/753 T, 52/309, 52/754, 52/483, 52/403
[51] Int. Cl............................................... F16b 7/22
[58] Field of Search... 287/20.92 T, 20.924, 20.925, 287/20.926, 20.927, 20.92 D, 189.36 D; 52/482, 395, 392, 160, 497, 483, 309, 403; 264/171, 177

[56] References Cited
UNITED STATES PATENTS

| 185,695 | 12/1876 | Onderdonk................ 287/189.36 D |
| 1,296,936 | 3/1919 | Edwards................ 287/20.92 D UX |
| 2,096,362 | 10/1937 | Lehman.............................. 264/171 |
| 3,186,129 | 6/1965 | Blood.............................. 160/371 X |
| 3,232,395 | 2/1966 | La Barge.................... 287/189.36 D |
| 3,338,284 | 8/1967 | Ausnit.................... 287/20.92 T UX |
| 3,439,406 | 4/1969 | Wallin........................ 287/189.36 D |
| 3,471,187 | 10/1969 | Riseborough.............. 287/189.36 D |
| 3,535,409 | 10/1970 | Rohde.............................. 264/171 X |
| 3,548,557 | 12/1970 | Downing.............................. 52/493 |
| 3,583,118 | 6/1971 | Lowery................ 287/187.36 D UX |

Primary Examiner—Jordan Franklin
Assistant Examiner—Wayne L. Shedd
Attorney, Agent, or Firm—Cumpston, Shaw & Stephens

[57] ABSTRACT

A panel mounting means uses a channel having an edge formed as a hook, and a complementary hook along the edge of the panel interlocks with the channel hook. A strip of resilient material is wedged in the channel to hold the hooks in interlocking relation.

7 Claims, 2 Drawing Figures

PATENTED SEP 3 1974  3,832,820

INVENTOR.
FRANK EGGERT
BY Cumpston, Shaw
and Stephens
ATTORNEYS

PANEL MOUNTING

BACKGROUND OF THE INVENTION

Many different panels or panel-like structures are presently secured in place in various ways. These include wall and ceiling panels, panels for lining the interior of aircraft and automobiles, panel-like covers for cable ducts, glasses for light fixtures, exterior wall or roof panels, etc. Present means for securing such panels in place are either too complicated or unreiliable, and are often difficult to seal properly.

The invention seeks a simple panel mounting means that provides a sealed closure against dust and liquid without being expensive or complex. The invention seeks a secure and reliable panel mounting that is convenient, easy to install, readily demountable, and formed inexpensively of simple materials.

SUMMARY OF THE INVENTION

The inventive panel mounting means includes a channel extending along a mounting edge of the panel and having an edge extending into the channel in a hook. A complementary hook extends along the mounting edge of the panel to interlock with the chanel hook, and a strip is wedged in the channel to hold the hooks in interlocking relation.

DRAWINGS

FIG. 1 is an enlarged, cross-sectional view of a preferred embodiment of the inventive panel mounting; and FIG. 2 is an exploded, cross-sectional view showing the assembly of the inventive panel mounting.

DETAILED DESCRIPTION

Figure 1:
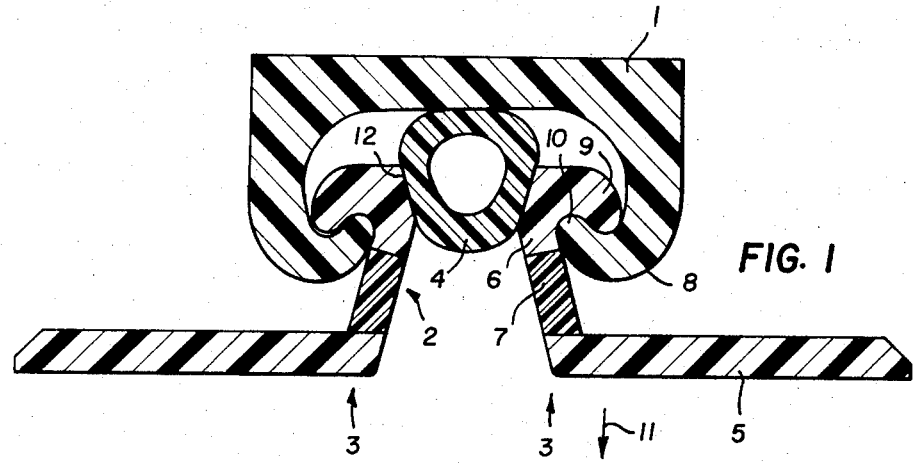

The panel mounting assembly illustrated in FIG. 1 includes: a batten or channel 1; a pair of panel mounting strips 3 each having angled projections 2; and a strip 4 shown as a round, flexible tube of elastomeric material having a rubber like resilience and circular in cross section when unstressed. Channel 1 is intended to be secured to a firm or fixed structure, for example, to a wall to be sheathed or paneled, and panel strips 3 are connected to panels to be mounted. Strips 3 may be bonded or mechanically fastened to panels or may be integrally formed with the backing of a panel to be mounted. Also, channels 1 may be integrally formed with a structure supporting the panels, for example, as part of the framing braces for a movable wall to be covered with panels.

Channel 1 can be formed in any desired manner of any desired material, for example, a plastic extrusion, or drawn or bent metal. Strips 3 are preferably formed of extruded plastic with a flange or footing 5 to be connected to a panel, and hook portion 6 formed of relatively solid, rigid and hard material, with an intermediate webb or strip support 7 formed of soft and resilient material. This is preferably accomplished in an integral extrusion using plastic materials of different hardness.

The edges of channel 1 extend into the channel to form hooks 8, and the hook portion 6 of strips 3 are complementary or inversely identical with hooks 8. Preferably hooks 6 and 8 have backwardly curved distal edges for a firm and complementary interlock, although this can be omitted. Any force in the direction of arrow 11 is resisted by hooks 8 and 9 without assistance from strip 4, and even forces angled slightly from arrow 11 do not affect the hook interlock.

Hooks 6 have slightly undercut surfaces 12 that cooperate with the bottom of channel 1 to form a flared space for wedgedly receiving strip 4 so that strip 4 cannot be withdrawn except by resilient deformation. Strip 4 is then safely retained in the space between surfaces 12 and the bottom of channel 1 and exerts a component of force upon hooks 6 urging them away from the bottom of channel 1 to hold hooks 6 and 8 firmly together in interlocking relationship. This also ensures that all strips 3 are spaced an equal distance from the bottom of channel 1 so that mounted panels are mutually aligned and even.

Figure 2:
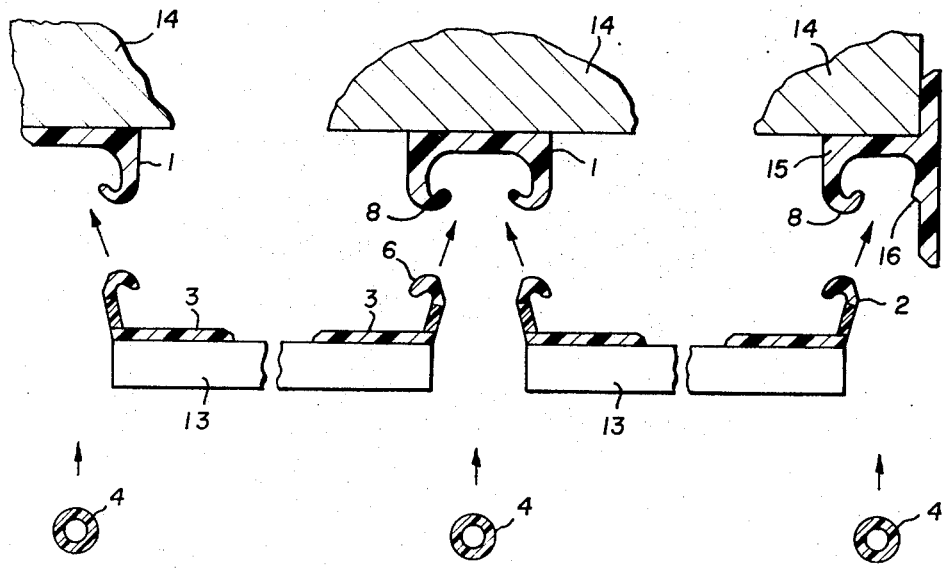

FIG. 2 shows an example of how sheathing panels 13 are secured to a backing or mounting structure 14. Strips 3 are adhesively bonded to opposite edges of sheathing panels 13, and channels 1 are secured in any desired manner to backing structure 14. Channels 1 are spaced so that hooks 8 are as far or slightly farther apart than hooks 6 on panels 13. This allows panels 13 to be easily snap-fit into channels 1 for temporary mounting, and is especially conveient for suspension mounting or ceiling panels. Strips 4 can then be inserted later to retain the parts in assembled position, and strips 4 can be snapped in place by hand, pressed in place with a screwdriver or other simple tool, or installed with tools such as those already known in mounting compressible filler strips.

Channel 1 is intended for securing pairs of strips 3 on adjacent panels 13, and a different channel 15 is used for securing a single strip 3. Channel 15 has a single hook 8 along one edge, and the opposite wall 16 of channel 15 is formed obliquely to hook 8 so that strips 4 can be inserted between wall 16 and projection 2 of strip 3 to hold hooks 6 and 8 in interlocking relation as previously described. Single hook channel 15 is used along the edge of an area to be paneled or around the perimeter of a single panel to be mounted. Channel 15 is useful for example in supporting the cover of a cable duct which is generally U-shaped in cross section and can have channels 15 secured to or integrally formed along its edges. For example, when a cable duct is formed of sheet metal, its edges can be integrally formed by rolling or by extrusion with an appropriate die to form channels 15 along its edges. Likewise, the cable duct cover can have strips 3 integrally formed along its edges such as by bending sheet metal or an extrusion of plastic, or separate strips 3 can be secured to the duct cover.

Panels 13 of FIG. 2 are easily disassembled after removing strip 4 which can be accomplished with simple tools because of the simple shape and elastic deformability of strip 4. Then one of the panels to be removed is gripped and displaced slightly laterally toward the bottom of the channel on one side until hooks 6 and 8 on this side become separated. Resilient deformation of strip 3 at the other edge of the panel allows this, and then the panel can be moved laterally back to disengage hook 6 onits other edge.

The inventive panel mounting is particularly useful where strength, resistance to vibration, secure sealing and adaptability and variability are called for, especially because of the ease of assembly and disassembly. One example of preferred use of the invention is in securing sheathing panels and installation boxes at predetermined spacing related to the seats in the passenger compartments of aircraft. Such panels and installation boxes have to be sufficiently easy to relocate if the seat spacing is changed or the aircraft is converted to cargo service.

Another advantage of the inventive panel mounting is that the interlocking hooks cooperate to provide positive retaining forces while the anchoring strip 4 does not practically participate in force transmission. This helps achieve a safe and secure mount and allows strip 4 to be formed as a simple tube to help reduce the cost of the mounting assembly. Thus, strip 4 can be formed of resilient material having a circular or other simple cross-sectional shape such as a flexible tube or a strip of closed-cell expanded rubber or plastic material.

Although hooks are shown along the opposite edges of panel 13 in FIG. 2, all the edges of the panel can be provided with hooks when a very tight seal is called for. For many purposes, panels 13 are safely retained in place without using wedge strips 40 between hooks 6 and channel 1 is preferred for more secure mounting and better alignment of panels 13. Strip 14 is preferably snap-fit into such a space so that it cannot be removed without resilient deformation. Strip 4 then not only laterally compresses hooks 6 into interlocking engagement with hooks 8, but also presses hooks 6 away from the bottom of channel 1 for an even firmer interengagement with hooks 8.

Hooks 6 and 8 preferably have the backward curvature at their distal ends 8 and 9 as illustrated for a secure interlock, although such backward curvature is not a requirement of the invention.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will appreciate the many materials, shapes, sizes, and ways of making channel secions, book sections, and anchoring strips for mounting panels according to the invention.

I claim:

1. Means for resiliently mounting a panel, said panel mounting means comprising:
   a. a fixed channel;
   b. said channel having an inturned edge forming a channel hook;
   c. a complementary panel hook extending along an edge of said panel to interlock with said channel hook;
   d. said panel hook being resiliently movable transversely relative to said panel sufficiently for hooking to and unhooking from said channel hook without moving said channel;
   e. an elastomeric strip deformable in cross section;
   f. said channel and said panel hook being configured for removably receiving said strip deformed and wedged between the bottom of said channel and the back of said panel hook for holding said panel hook in interlocking relation with said channel hook, and said panel hook trapping said strip in said channel;
   g. a resiliently yieldable support strip supporting said panel hook at a distance from said panel to leave a clearance between said panel and said channel hook when said hooks are interlocked, and said channel hook extending far enough from said channel bottom to leave a clearance between said panel hook and said channel bottom to allow resilient relative movement of said panel toward said channel; and
   h. the back of said panel hook has a beveled edge engaging aid elastomeric strip and oriented at an acute angle to said channel bottom so that said elastomeric strip engages said beveled edge and biases said panel hook away from said channel bottom and into said interlock with said channel hook.

2. The means of claim 1 wherein said channel has an oblique wall opposite said beveled edge of said channel hook to define a flared space for receiving said strip.

3. The means of claim 1 wherein said elastomeric strip is a length of tubing circular in cross section.

4. The means of claim 1 wherein said panel hook is formed of a relatively hard and rigid plastics material and said support strip is formed of a relatively soft and resilient plastics material.

5. The means of claim 1 wherein each edge of said channel is inturned to form one of said channel hooks, said panel hooks of an adjacent pair of said panels interlock respectively with each of said channel hooks, and said elastomeric strip is wedged in said channel between said beveled edges of said panel hooks and said channel bottom.

6. The means of claim 5 wherein said elastomeric strip is a length of tubing circular in cross section.

7. The means of claim 5 wherein said panel hook is formed of a relatively hard and rigid plastics material and said support strip is formed of a relatively soft and resilient plastics material.

* * * * *